United States Patent
Bachelder et al.

(10) Patent No.: US 7,479,967 B2
(45) Date of Patent: Jan. 20, 2009

(54) SYSTEM FOR COMBINING VIRTUAL AND REAL-TIME ENVIRONMENTS

(75) Inventors: Edward N. Bachelder, Redondo Beach, CA (US); Noah Brickman, Topanga, CA (US)

(73) Assignee: Systems Technology Inc., Hawthorne, CA (US)

( * ) Notice: Subject to any disclaimer, the term of this patent is extended or adjusted under 35 U.S.C. 154(b) by 188 days.

(21) Appl. No.: 11/104,379

(22) Filed: Apr. 11, 2005

(65) Prior Publication Data

US 2007/0035561 A1    Feb. 15, 2007

(51) Int. Cl.
G09G 5/02    (2006.01)
G09G 5/00    (2006.01)

(52) U.S. Cl. .................... 345/592; 345/629; 345/632

(58) Field of Classification Search ............ 345/620, 345/633
See application file for complete search history.

(56) References Cited

U.S. PATENT DOCUMENTS

| | | | |
|---|---|---|---|
| 5,490,239 A | | 2/1996 | Myers |
| 5,625,765 A | * | 4/1997 | Ellenby et al. ............ 345/633 |
| 5,742,263 A | * | 4/1998 | Wang et al. ................. 345/8 |
| 5,751,289 A | | 5/1998 | Myers |
| 5,914,748 A | * | 6/1999 | Parulski et al. ........... 348/239 |
| 5,963,891 A | | 10/1999 | Walker |
| 6,037,936 A | * | 3/2000 | Ellenby et al. ............ 715/764 |
| 6,045,229 A | * | 4/2000 | Tachi et al. ............... 353/28 |
| 6,064,398 A | * | 5/2000 | Ellenby et al. ............ 345/633 |
| 6,084,556 A | * | 7/2000 | Zwern ....................... 345/8 |
| 6,166,744 A | * | 12/2000 | Jaszlics et al. ........... 345/629 |
| 6,181,302 B1 | * | 1/2001 | Lynde ....................... 345/7 |
| 6,396,495 B1 | | 5/2002 | Parghi |
| 6,414,697 B1 | * | 7/2002 | Amro et al. ............... 715/772 |
| 6,633,304 B2 | * | 10/2003 | Anabuki et al. ........... 345/633 |
| 6,798,407 B1 | | 9/2004 | Benman |
| 6,803,928 B2 | * | 10/2004 | Bimber et al. ............. 715/757 |
| 7,002,551 B2 | * | 2/2006 | Azuma et al. ............. 345/158 |
| 7,074,999 B2 | | 7/2006 | Sitrick |
| 7,079,151 B1 | * | 7/2006 | Rublee ..................... 345/589 |

(Continued)

OTHER PUBLICATIONS

Krishnaswamy, Writing Mobile Games Using the Microsoft .Net Compact Framework, Microsoft Corporation, Apr. 2003. pp. 1-16.*

Primary Examiner—Kee M. Tung
Assistant Examiner—Motilewa Good-Johnson
(74) Attorney, Agent, or Firm—Lewis Brisbois Bisgaard & Smith LLP (57) ABSTRACT

The present invention relates to a method and an apparatus for combining virtual reality and real-time environment. The present invention provides a system that combines captured real-time video data and real-time 3D environment rendering to create a fused (combined) environment. The system captures video imagery and processes it to determine which areas should be made transparent (or have other color modifications made), based on sensed cultural features and/or sensor line-of-sight. Sensed features can include electromagnetic radiation characteristics (i.e. color, infra-red, ultra-violet light). Cultural features can include patterns of these characteristics (i.e. object recognition using edge detection). This processed image is then overlaid on a 3D environment to combine the two data sources into a single scene. This creates an effect where a user can look through 'windows' in the video image into a 3D simulated world, and/or see other enhanced or reprocessed features of the captured image.

20 Claims, 7 Drawing Sheets

U.S. PATENT DOCUMENTS

| | | |
|---|---|---|
| 7,098,392 B2 | 8/2006 | Sitrick |
| 7,315,241 B1 * | 1/2008 | Daily et al. ................. 340/525 |
| 2003/0110925 A1 | 6/2003 | Sitrick |
| 2003/0142068 A1 * | 7/2003 | DeLuca et al. .............. 345/156 |
| 2005/0017215 A1 | 9/2005 | Lange |
| 2005/0245302 A1 * | 11/2005 | Bathiche et al. ................ 463/1 |
| 2005/0285962 A1 | 12/2005 | Comejo |

* cited by examiner

Figure 5. RGB intensity values, a) Blue vs. Red; b) Green vs. Red.

SYSTEM FOR COMBINING VIRTUAL AND REAL-TIME ENVIRONMENTS

BACKGROUND

1. Field of the Invention

The present invention relates to the field of virtual reality.

Portions of the disclosure of this patent document contain material that is subject to copyright protection. The copyright owner has no objection to the facsimile reproduction by anyone of the patent document or the patent disclosure as it appears in the Patent and Trademark Office file or records, but otherwise reserves all rights whatsoever.

2. Background Art

As the power and speed of computers has grown, so has the ability to provide computer generated artificial and virtual environments. Such virtual environments have proven popular for training systems, such as for driver training, pilot training and even training in performing delicate medical and surgical procedures. The system involves combining prerecorded or computer generated visual information with a real world environment to provide the perception of a desired environment. For example, a driver's training simulator may include a physical representation of the driver's seat of an automobile with a video or computer generated image of a road and traffic projected on what would be the windshield of the simulator car of a student driver. The image is made to be reactive to the actions of the driver, by changing speeds and perspectives in response to acceleration, braking and steering by the driver. Similarly, sophisticated flight simulators include a physical cockpit and projected flight environment that presents real world situations to the pilot via a display.

In some cases, a virtual reality is projected in front of the eyes of a user via a virtual reality helmet, goggles, or other input device, so that the only image seen by the user is the virtual image. In other instances, mirrors and partially reflective materials are used so that a user can view both the real world environment and the virtual environment at the same time.

A disadvantage of prior art virtual reality and simulation systems is the difficulty in combining real world and virtual world images in a realistic and open ended manner. In some cases, certain views and angles are not available to a user because they require prior calculation of image perspective and cannot be processed in real time. In other instances, the ability to interact with the virtual world with physical objects is limited or unavailable.

SUMMARY

The present invention relates to a system including methods and apparatus for combining virtual reality and real-time environment. The present invention provides a system that combines captured real-time video data and real-time 3D environment rendering to create a fused (combined) environment. The system captures video imagery and processes it to determine which areas should be made transparent (or have other color modifications made), based on sensed cultural features and/or sensor line-of-sight. Sensed features can include electromagnetic radiation characteristics (i.e. color, infra-red, ultra-violet light). Cultural features can include patterns of these characteristics (i.e. object recognition using edge detection). This processed image is then overlaid on a 3D environment to combine the two data sources into a single scene. This creates an effect by which a user can look through 'windows' in the video image into a 3D simulated world, and/or see other enhanced or reprocessed features of the captured image. The invention also provides methods of using objects in both near-field and far-field environments. A physical near-field object can be used and moved into a far-field distance. At that point, a virtual far-field representation of the object is projected to the user. In this manner, manipulations of objects can be done at great distances without requiring large physical spaces for the system.

DETAILED DESCRIPTION OF THE INVENTIVE SYSTEM

Described herein are several embodiments of a system that includes methods and apparatus for combining virtual reality and real-time environments. In the following description, numerous specific details are set forth to provide a more thorough description of these embodiments. It is apparent, however, to one skilled in the art that the system need not include, and may be used without these specific details. In other instances, well known features have not been described in detail so as not to obscure the inventive features of the system.

One prior art technique for combining two environments is a movie special effect known as "blue screen" or "green screen" technology. In this technique, an actor is filmed in front of a blue screen and can move or react to some imagined scenario. Subsequently, the film may be filtered so that everything blue is removed, leaving only the actor moving about. The actor's image can then be combined with some desired background or environment so that it looks like the actor is actually in some desired location. This technique is often used in filming scenes involving driving. Actors are filmed in a replica of a car in front of a blue screen. Some movement (shaking) is provided to simulate driving over a road surface and the driver might even turn the wheel as if turning the car. In reality, of course, the car does not move at all. Next, the scene of the drivers is combined with footage taken by cameramen in a real car on the road on which the actors are pretending to drive. The result gives the perception that the actors are actually driving a car on the road. This process is also referred to as chroma-key.

Typically, motion picture chroma-key shots are done in several steps over time, making the system inapplicable for real time virtual environments. However, some chroma-key processes are used in real time in certain video and television applications. For example, a television weatherman is typically shot live in front of a chroma-key matte, such as a blue screen or green screen. The weatherman's image (with the matte color filtered out) is combined with an image from another source, such as the weather map or satellite picture, with which the weatherman appears to interact. In reality, the weatherman is watching a monitor with the weather map image on it and uses that to point at portions of the blue screen which would correspond to the weather map. Such an application is very limited and doesn't permit realistic interaction on the part of the human involved with the virtual image.

The present inventive system permits a user to see and work with physical objects at close range (near field) and to have these objects transition to virtual or computer generated images as they move to a threshold distance away from the user (far field). The system also provides a field of view visual system by using motion cueing systems to account for user position and orientation. The system uses live video capture, real-time video editing, and virtual environment simulation.

System

Figure 1:
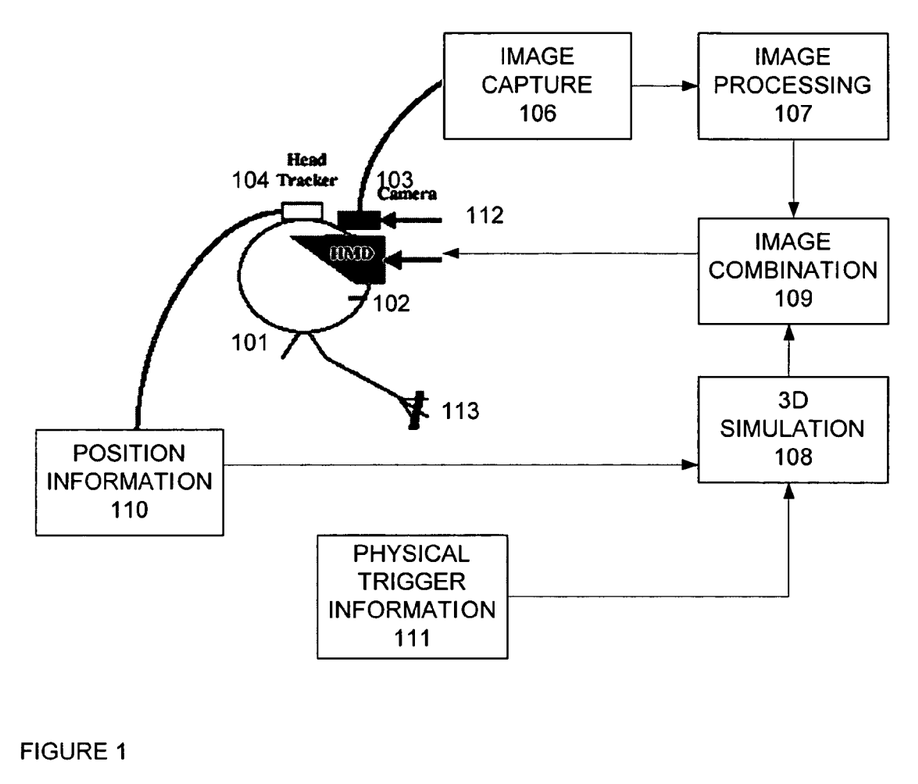
FIG. 1 illustrates an example of one embodiment of the inventive system.

One preferred embodiment of the inventive system comprises cameras, processors, image generators, position detectors, displays, physical objects, and a physical space. FIG. 1 illustrates one embodiment of the system of the present invention. A user 101 is equipped with a head mounted display (HMD) 102. Atop the HMD 102 is mounted a camera 103 for receiving the actual physical image 112 viewed by the user 101. The camera may alternatively be integrated with the HMD or not, but is mounted at some location where the camera 103 at least approximately has the same view as the user's eyes. The user 101 is equipped with a head tracker 104 which provides 3D spatial information about the location and direction of the head of the user 101. The head tracker is used to permit proper perspective and viewing angle of the virtually generated portions of the display image on the HMD 102.

The user 101 can interact with physical objects in the environment. In FIG. 1, the user 101 is shown interacting with a handle 113. Some physical objects may be used to represent real world counterparts, such as accelerators, steering mechanisms, firing devices, etc. The output of the camera 103 is provided to an image capture block 106 and then to image processing block 107. The purpose of the image processing block 107 is to identify all areas of real video image that should be transmitted through to the HMD 102 and which areas are to be overlaid with virtual imagery.

Head tracker 104 is coupled to position information block 110 where the location and direction of the user's head is derived. This information is provided to 3D simulation block 108 which generates a possible 3D image based on the location of user 101 and line of sight of user 101. Any input from physical devices is provided to physical trigger information block 111 and then to 3D simulation block 108. Trigger block 111 is used to indicate any changes that should be made to the generated virtual image based on manipulation of physical objects by user 101. The output of 3D simulation block 108 is provided, along with the output of image processing block 107, to image combination block 109. The virtual image is overlaid with the real image via a masking process so that the virtual image is only visible in desired areas of the frame. This combined image is provided to the user via the HMD 102 and it is this combined image that the user 101 is viewing.

Environment

Figure 2:
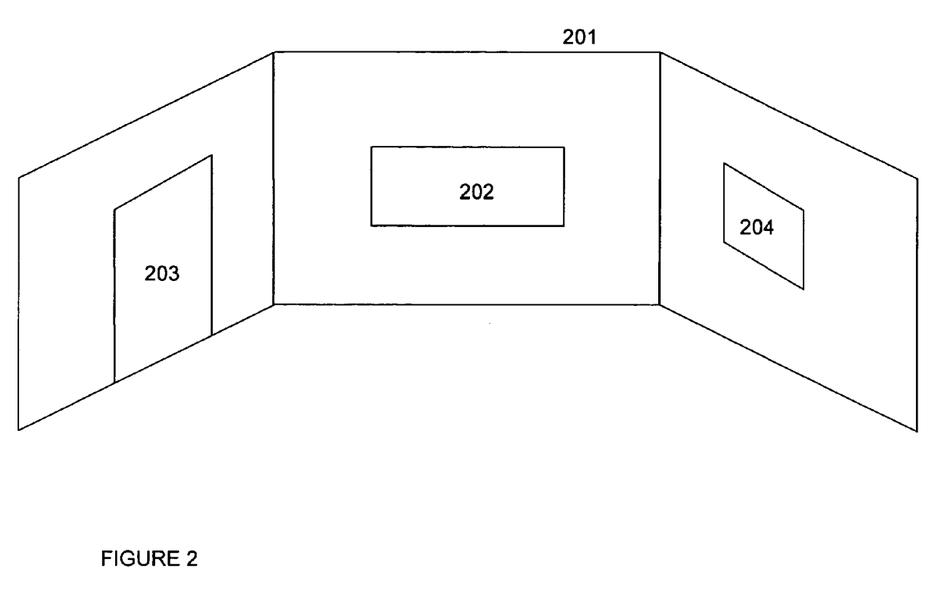
FIG. 2 illustrates an example environment for use in the inventive system.

One embodiment of the system is used in a combination physical/virtual environment. The physical environment may vary from application to application, depending on the desired use of the invention. By way of example, consider the inside of a vehicle, such as a helicopter, truck, boat, etc. FIG. 2 illustrates a partial view of an interior with a combination of physical and virtual regions defined. Referring to FIG. 2, a wall 201 is shown with a windshield 202, a door 203 and window 204 defined in the wall (virtual world). This might represent the interior of a helicopter, personnel carrier, boat, or some other environment. The virtual spaces 202-204 are represented in this embodiment by the application of a specific color, such as magenta. In one embodiment, the defined virtual surfaces 202-204 are flat surfaces painted the desired color. In another embodiment, the areas 202-204 are openings in wall 201, backed with shallow dishes painted the desired color. In such an embodiment, the user 101 can actually extend himself and physical objects seemingly beyond the boundaries of the defined environment.

Image Generation

Figure 3:
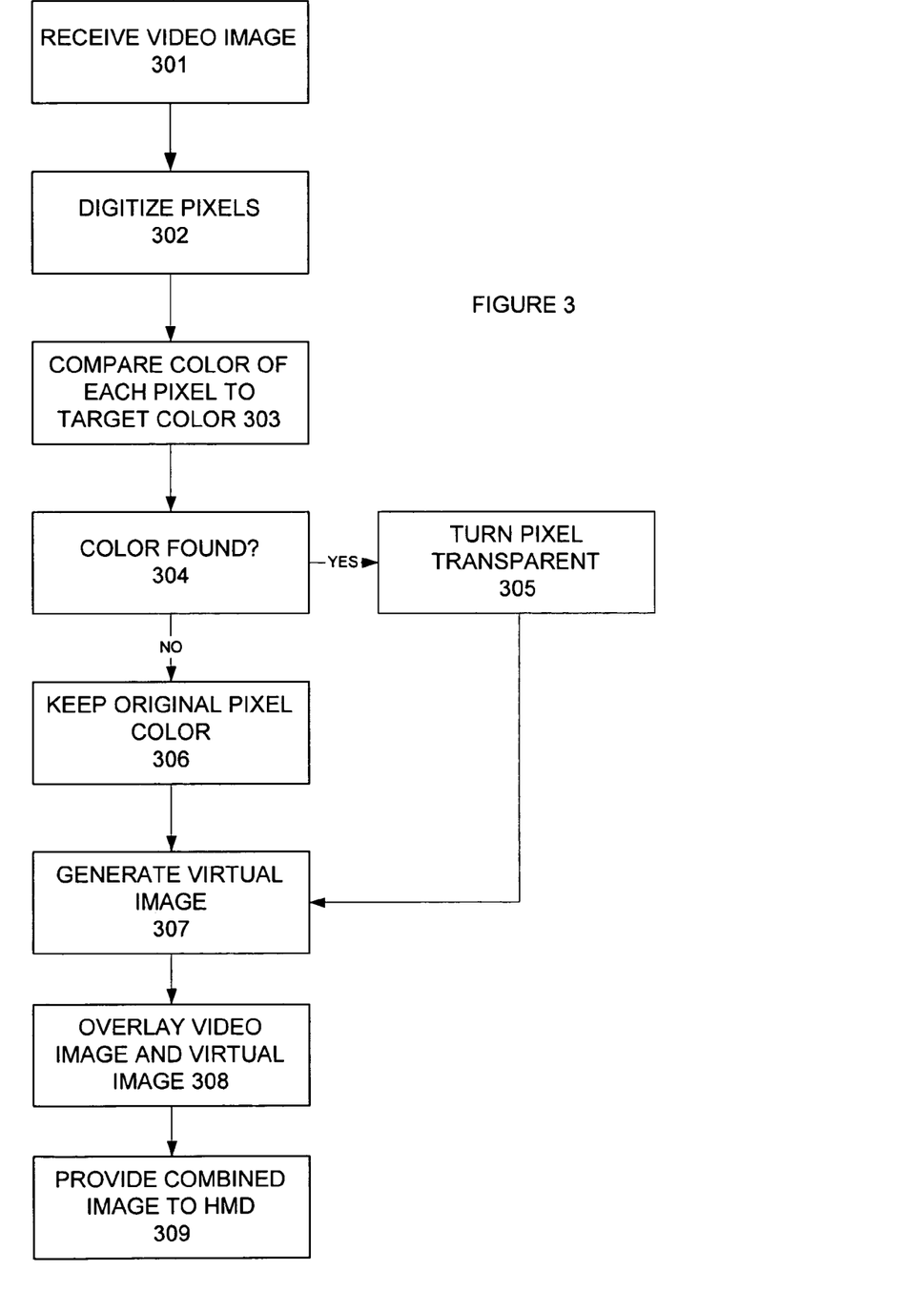
FIG. 3 is a flow chart illustrating the operation of an embodiment of the system.

The system of FIG. 1, when used with an environment such as is shown in FIG. 2, provides the ability to offer a virtual environment that is a combination of real and virtual images. FIG. 3 is a flow chart describing how image combination and generation takes place. At step 301, the camera 103 receives a video frame. At step 302 the frame is digitized to yield a frame buffer of digital value pixels. Alternatively the camera could be a digital camera that captures the image as digital pixels. The pixels are stored with attributes including color and intensity. For example, the pixels may be stored as 32 bit values with eight bit red, green, and blue values along with an eight bit alpha value.

At step 303 the color of each pixel is compared to a target masking color. In one embodiment of the invention, the target value is magenta. Magenta is chosen because it is an atypical color in most environments and has high selectability in different light conditions. The goal is to render a frame mask that makes each pixel that matches the target color to be transparent. At decision block 304 it is determined (for each pixel) if the target color is matched by the pixel under review. If yes, the pixel is turned transparent at step 305. If no, the original color of the pixel is maintained at step 306. This decision process is performed for each pixel in the frame.

At step 307 the virtual image is generated based on the current state of the environment and other factors described below. At step 308 the video image (with matching pixels rendered transparent) is overlaid onto the virtual image. The combined image will show the actual video except where the pixels have been turned transparent. At those locations the virtual image will be seen. At step 309 this combined image is provided to the HMD and the user sees a desired combination of real and virtual images.

Figure 4A:
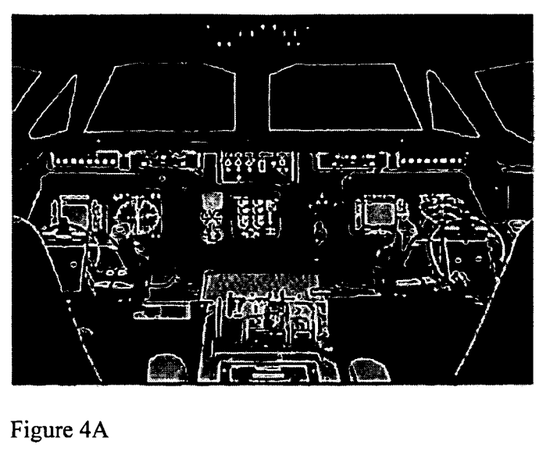
FIGS. 4A-4C illustrate image combination in the system.
Figure 4B:
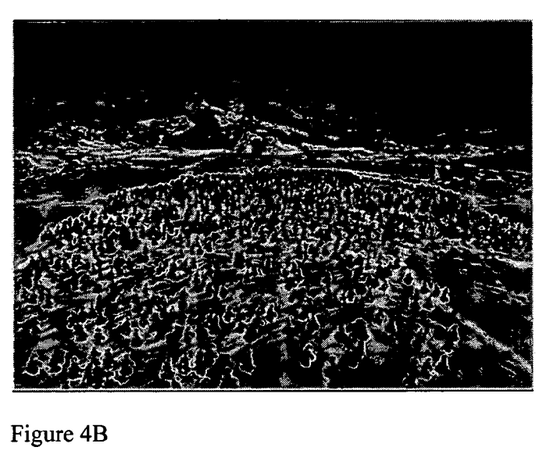
Figure 4C:
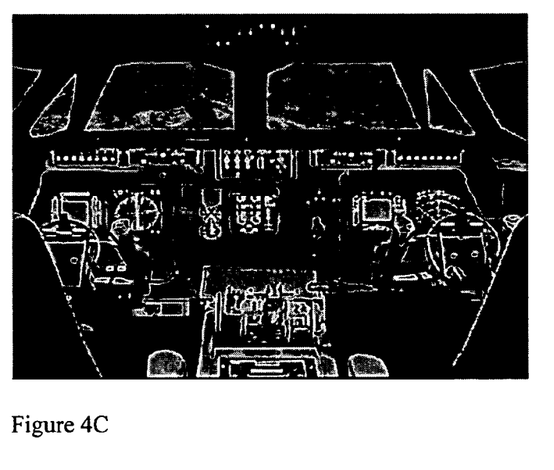

FIGS. 4A-4C illustrate an example of the operation of an embodiment of the system. FIG. 4A shows an actual cockpit with the windows painted magenta (or some other suitable target color). FIG. 4B shows a virtual environment. When the magenta portions of the cockpit are rendered transparent and overlaid over the virtual image of FIG. 4B, the resulting combined image is shown in FIG. 4C. As can be seen in FIG. 4C, only those portions of the virtual image corresponding to the transparent pixels are shown in the combined image. The rest of the virtual image is masked by the unchanged pixels of the real video image.

In an alternate embodiment, rather than specify the color range of the pixels that will be made transparent (i.e. the background color), the technique may specify the color range of the pixels that will be preserved—all other pixels would be rendered transparent and replaced with the virtual environment. For instance, green could be designated as the color that will be preserved. Thus a trainee's flight suit and flight gloves would be displayed as a real-time image that the trainee observes. Interactive hardware that is physically touched (such as a gun, litter, or hoist) that is painted a green would similarly be displayed, as would the trainee's boots if they are sprayed with a non-permanent coating of green. The rest of the environment can be virtual, consisting mainly of texture maps of the cabin interior and hardware that will not be touched by the viewer.

Training of Color Recognition

One aspect of the system that relates to the use of a target color as a filter for combining images concerns the need to accurately track the color in a variety of dynamically changing lighting conditions. The color magenta may not appear to be a color within the threshold range of recognition in different lighting conditions. For example, the magenta background may appear closer to white in extremely bright lighting and closer to black in low light conditions. If the target color and zones are not recognized accurately, the image combination will not look realistic. Another embodiment of the system implements a camera with a user-controlled exposure setting to address this problem. Many micro cameras only offer auto-exposure (a cost and space-saving feature), whereby the camera self-adjusts to the sensed light intensity in its field-of-view. This automatically changes the color settings of all viewed objects so as to maximize overall contrast. However, such designs do not allow tight tolerances to be set for the color that is to be filtered in the system (i.e. magenta). Using auto-exposure, tolerances would have to be low enough to accommodate for changes in environmental lighting and reflected object brightness, but this could allow unintended colors in the video image to be filtered, or conversely, fail to filter when desired. By selecting and fixing the camera exposure level, the color of objects in the video image would remain constant for a given lighting level. To further ensure that the portal surface color to be filtered remains constant, the portal surface color could be made to emit its own light instead of relying on reflected light.

Figure 5:
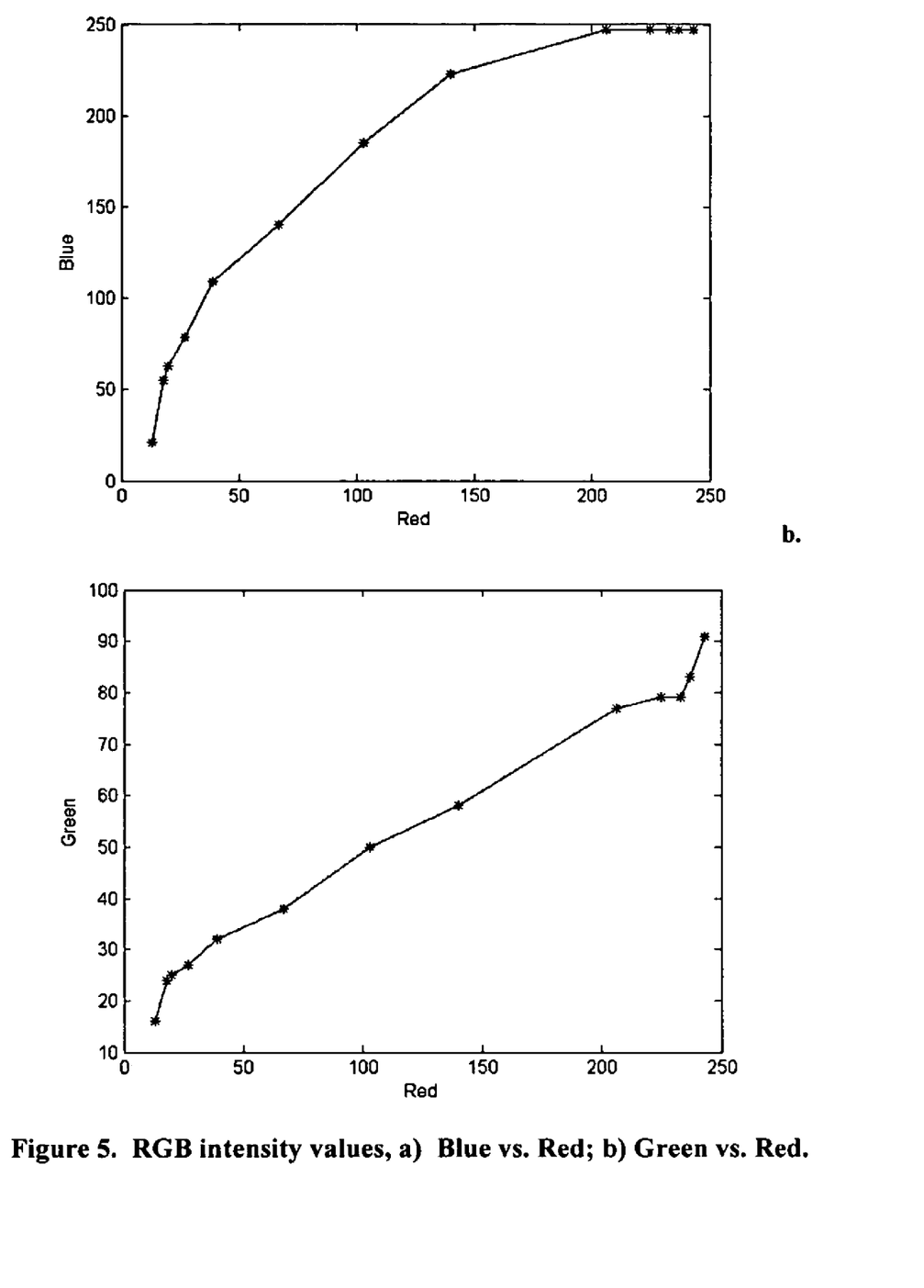
FIG. 5 illustrates RGB intensity values for a target color at different lighting conditions.

Another solution to target color recognition is to train the system in a variety of lighting conditions so that accurate pixel masking may result. In attempts to produce this, light intensity reaching a magenta panel is varied by changing the distance between a light bulb and the panel. The camera is trained on the magenta panel while in the auto-exposure mode, and for each new distance the RGB components registered by the camera are recorded—in effect generating an RGB map for varying light intensities. FIG. 5 shows the resulting profiles of Green and Blue as functions of Red intensity. Any measured value of Red that the camera registers can be checked against the corresponding Green and Blue values that the profiles predict. A match results if the predicted and measured values fall within a predetermined range of each other.

With the adaptive color recognition in place, the camera can be in auto-exposure mode, where the picture gain is automatically increased or lowered (made brighter or darker) as the camera attempts to keep the overall picture brightness constant (this is a feature of most if not all video cameras). Consequently, the present system is not limited to more expensive cameras that include manual exposure or fixed exposure. Instead, nearly any simple web cam (they can measure as little as 1" in length) can be used, reducing cost and complexity of the system while increasing its robustness to variability.

Figure 6:
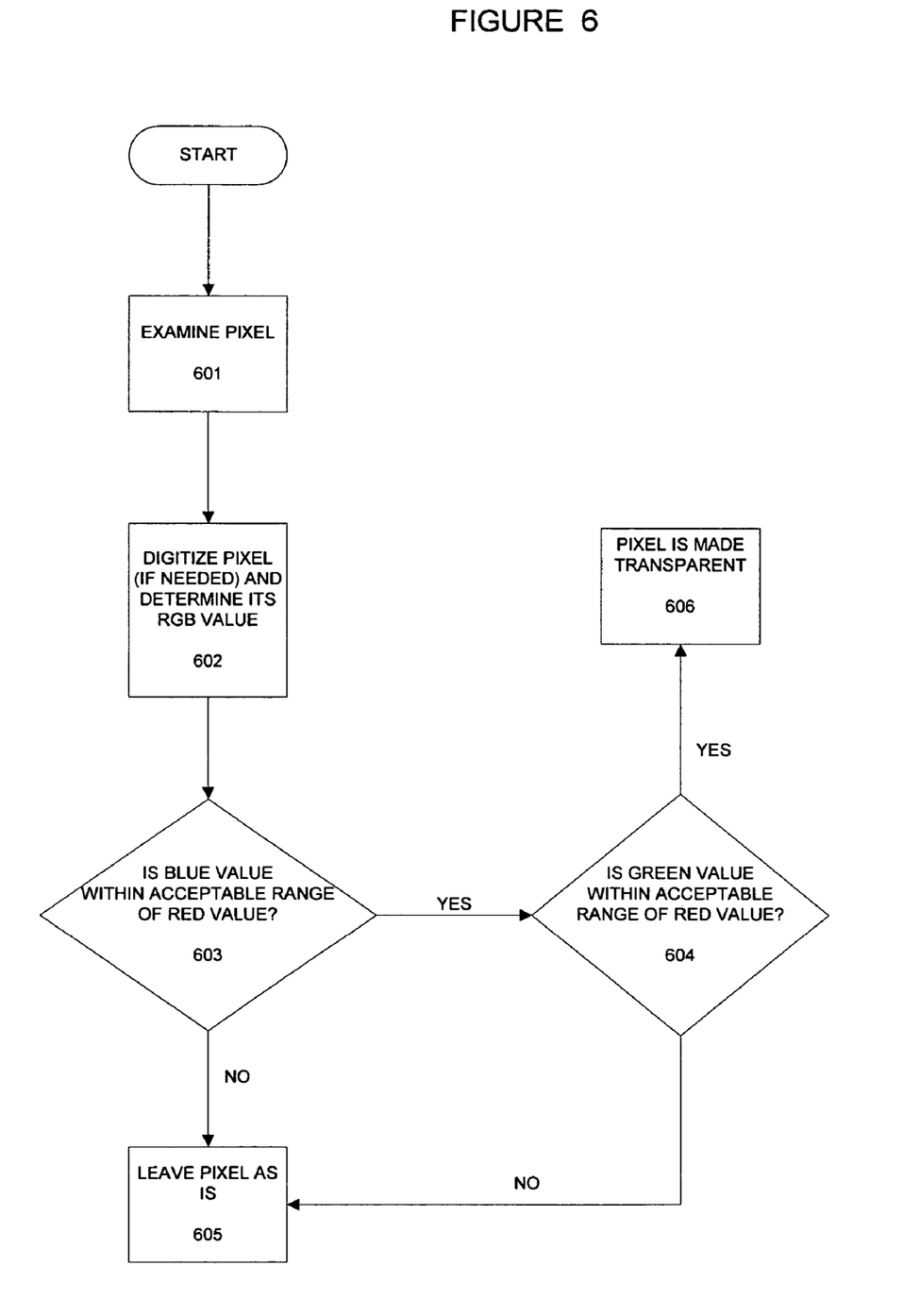
FIG. 6 is a flow diagram illustrating the target color matching algorithm in an embodiment of the inventive system.

FIG. 6 is a flow diagram illustrating operation of the present system in recognizing pixel color for masking. At step 601 a pixel is examined. At step 602 the pixel is digitized (if necessary) and the RGB values are determined. If there is a measurable red component, it is compared to the intensity graphs of FIG. 5. At step 603 it is determined if the blue value is within an acceptable range for the corresponding red value. If so, the system proceeds to step 604. If not, the system leaves the pixel as is at step 605.

At step 604 it is determined if the green value is within the acceptable range for the corresponding red value. If so, then the pixel is considered to be the target color and is made transparent at step 606. If not, the pixel is left as is at step 605.

Combination of Near and Far Field Images

One advantage of the present invention is that it allows a user to observe and physically interact with the near-space environment while the simulated farspace domain is seamlessly interwoven into the visual scene. Additionally, this technique enables a user to physically hold an object, release and send it into the far-space environment (such as a litter lowered from a helicopter cabin toward the simulated water below), perform tasks that affect that object (which is now part of simulated far-space), and retrieve and physically grasp the object once again in the near-space domain.

Current virtual reality (VR) graphics do not provide good representations of objects that are relatively close to the observer, i.e. closer than arm's length, because they distort perspective at these distances. For the VR user to perform basic manual tasks such as gunnery, the digits of the hands would have to be tracked—not just the fingertips, but also the joints and hands. Where speed and dexterity are required for complex manual tasks, such as removing a gun barrel, VR would not be feasible due to masking, sensor lag, and component simulation fidelity issues. With regard to design, the far-space environment that is projected onto screens is clearly distinguishable from the near-space environment (cockpit controls, hands, etc), which detracts from realism. This delineation between environments can arise from: screen distortion effects, seaming (and blank space) between screens that are intended to connect continuously, low screen resolution, screen reflection, etc. The present invention converts both the near and far-space to bitmaps, so that the visual quality between the two environments is much more consistent.

To accomplish an effective transition and realistic presentation of near-field to far-field images, the present invention uses images of the actual physical device being used in the simulation. For example, consider when the simulation is a helicopter, and the device to be used in near-field and far-field is a stretcher on a winch. One objective for use of the system is to maneuver the stretcher out of a door of the helicopter and lower it below to train for a rescue operation.

For example, the stretcher is lowered from the helicopter with a winch that is located and operated within the cabin. The aircrew would not make physical contact with the stretcher when the winch is in operation. Rather than build an actual replica of the stretcher and place it outside the cabin, texture maps of its image taken at different perspectives (for example, eight perspectives ranging from a direct side view to looking straight down on top) could be used. These photos would initially be taken with a colored backdrop and later processed so that only the pixels belonging to the hardware remain (the backdrop color pixels are removed). These eight texture maps would then be assembled, similar to putting together a box. The resulting 3D texture map mesh would give the user extremely realistic perspectives of the assembly as the stretcher (mesh) is lowered from the cabin to the water below. The winch could be a piece of actual hardware, since the aircrew must physically interact with it. The stretcher texture map translation would be slaved to the winch's actual rotation.

Figure 7:
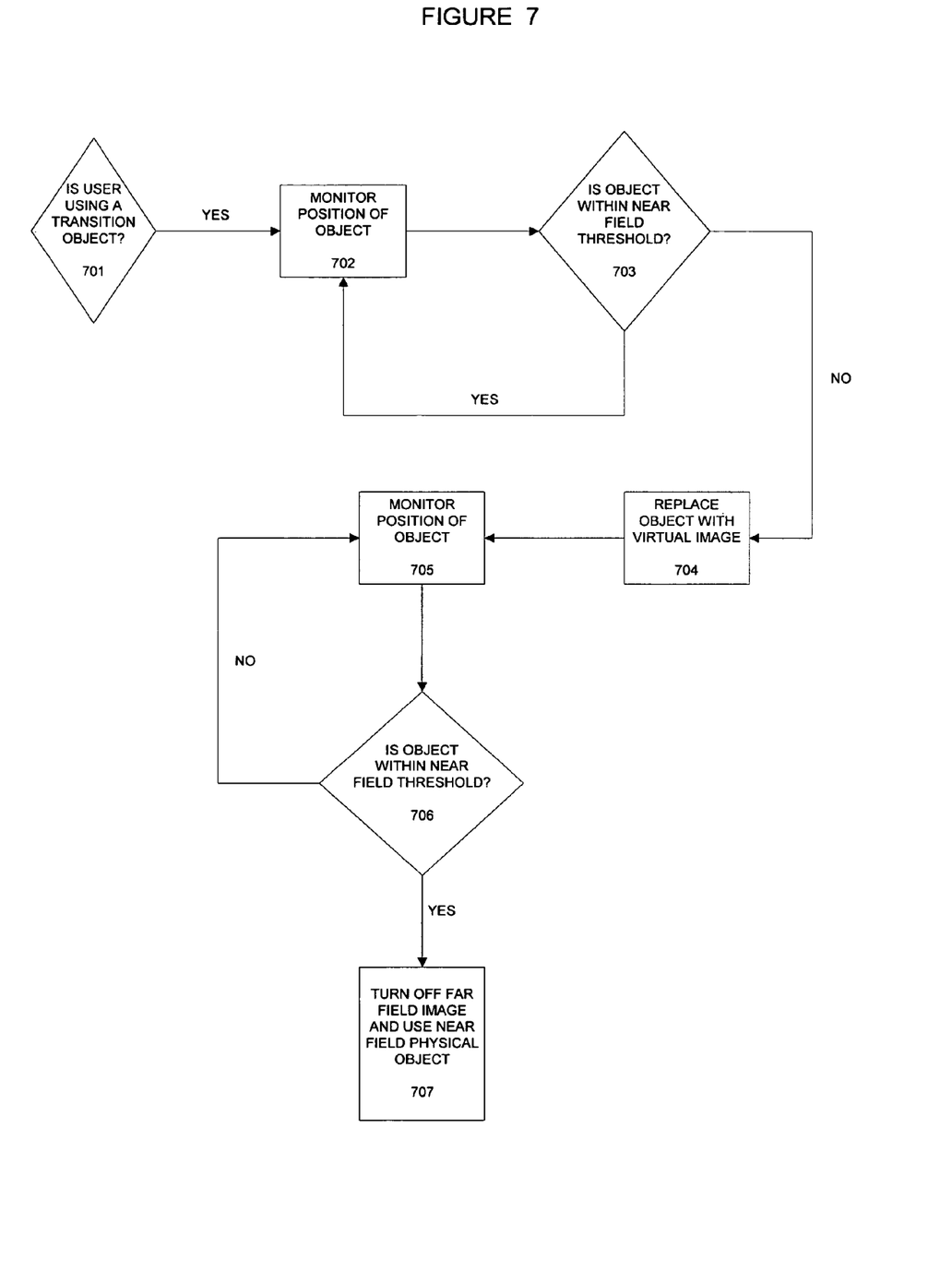
FIG. 7 is a flow diagram illustrating near-field/far-field transition operation of an embodiment of the inventive system.

FIG. 7 illustrates the operation of an embodiment of the system in near-field/far-field transition. At step 701 the system determines if a user is using a "transition object" (i.e. an object that will be moved from near-field to far-field and vice-versa). If so, the position of the transition object is monitored at step 702. At step 703 it is determined if the object is within the near-field threshold. If so, the system does nothing at step 703 and continues monitoring at step 702. If the transition moves beyond the near-field transition at step 703 (the "no" branch), then the object is replaced with a virtual image at step 704. The perspective and position of the object in the far-field virtual image depends on the orientation of the user manipulating the transition object as well as any controls (i.e. winch operation control) that are being manipulated by the user. At step 705 the system monitors the position of the far-field transition object. At step 706 it is determined if the object comes close enough to the user to become a near-field object. If not (the "no" branch), the object remains a far-field object and monitoring continues at step 705. If the object returns to the near-field, the system turns off the far-field image at step 707 and the near-field physical object is again used.

The near-field/far-field transition capabilities of the invention permit a range of training exercises and manipulations that would not be possible in a traditional VR system. With weapons, for example, a user can hold a physical weapon in his hands in the near-field. Use of the trigger activates bullets or other projectiles that only appear in the far-field.

Thus, a method and apparatus for combining a virtual and real-time environment is described in conjunction with one or more specific embodiments. The invention is defined by the following claims and their full scope and equivalents.

We claim:

1. A virtual reality system comprising:
   a camera adapted to receive images of a physical environment and to produce a frame of the physical environment that contains pixels representing a plurality of colors;
   a predetermined target color;
   a means for processing the frame and rendering pixels of the target color of the frame to be transparent pixels;
   a means for generating a virtual image;
   a means for combining the virtual image with the frame of the physical environment to form a combined image whereby the virtual image is visible at all positions of the transparent pixels; and,
   a means for displaying the combined image.

2. The system of claim 1 wherein the target color is magenta.

3. The system of claim 1 further including a means for comparing the pixels of the frame to the target color under different predetermined lighting conditions to determine a match with the target color exists at any of the predetermined lighting conditions.

4. The system of claim 1 further including a means for tracking locations of a physical object moving within a predetermined distance from the camera to produce a tracked object image and for replacing the tracked object image with a virtual image when the physical object moves beyond the predetermined distance from the camera.

5. A method for combining virtual reality environments and real-time environments for a user comprising:
   identifying a target masking color;
   providing a real-time environment having a predesignated area to be overlaid with virtual reality images and having the target masking color covering the predesignated area;
   providing the virtual reality images;
   providing the user with a head mounted display;
   providing a camera and mounting the camera at a location on the head of the user and from which the camera has a view substantially similar to the view of the user's eyes;
   providing 3D spatial information about the location and direction of the user's head;
   operating the camera to provide a real video image of the real-time environment;
   capturing the real video image in digital pixels;
   identifying all areas of the real video image to be overlaid with virtual video images by comparing the color of all of the pixels to the target color;
   making transparent all pixels whose color matches the target color;
   overlaying the real video images onto the virtual video images to form a combined image; and,
   providing to the head mounted display the combined display.

6. A computer-implemented system for combining a virtual reality environment and a physical environment for a user comprising:
   a computer;
   a camera operatively connected to the computer and adapted to provide to the computer real-time physical environment video images in digital pixels and adapted to be mounted on the head of a user at a location from which the camera has a view substantially similar to the view of the user's eyes;
   a physical object operatively connected to the computer, and adapted to interact with the user and to provide input to the computer in response to interaction with the user;
   a virtual image generator operatively connected to the computer and adapted to provide to the computer virtual video images in digital pixels;
   a position detector operatively connected to the computer, and adapted to be mounted on the head of the user and to provide to the computer 3D spatial information about the location and direction of the user's head;
   an image display operatively connected to the computer, adapted to be mounted on the head of the user and adapted to receive video images from the computer;
   a real-time physical environment;
   a pre-determined target masking color covering a predesignated area of the real-time physical environment;
   all areas of the real-time physical environment video images in which the color of the pixels of the real-time physical environment video images match the target color being transparent;
   the computer adapted to change the virtual video images in response to the input to the computer from the physical object;
   the real-time physical environment video images overlaid onto the virtual video images to form combined video images; and,
   the combined video images provided to the image display.

7. The system of claim 6 in which the pre-determined target masking color is magenta.

8. The system of claim 6 in which the real-time physical environment is representative of the inside of a vehicle.

9. The system of claim 8 in which the pre-designated area is representative of a window of the vehicle.

10. The system of claim 6 in which the physical object is representative of any of a handle, an accelerator, a steering mechanism or a firing device.

11. The system of claim 6 in which the real-time physical environment is the inside of a helicopter.

12. The system of claim 1 wherein said means for generating a virtual image is adapted to project said virtual image onto a pre-designated area that is a flat surface.

13. The system of claim 1 wherein said means for generating a virtual image is adapted to project said virtual image onto a pre-designated area that is a shallow dish.

14. The system of claim 1 wherein the camera includes a user-controlled exposure capability.

15. The system of claim 1 wherein the camera includes an automatic exposure capability.

16. The system of claim 1 wherein said means for generating a virtual image is adapted to project said virtual image onto a pre-designated area that is adapted to emit light to keep constant the target color in a variety of dynamically changing lighting conditions.

17. The system of claim 1 wherein the means for processing the frame and rendering pixels of the target color of the frame to be transparent pixels is adapted to make transparent all areas of the real video images in which the color of the pixels of the real video images match the target color in a variety of dynamically changing lighting conditions.

18. The system of claim 17 in which the means for processing the frame and rendering pixels of the target color of the frame to be transparent pixels includes an RGB map of profiles of Green and Blue as functions of Red intensity for varying light intensities and to check measured Red values registered by the camera against corresponding Green and Blue values that the profiles predict, whereby a match results if the predicted and measured values fall within a predetermined range of each other.

19. The system of claim 6 in which the real-time physical environment is a near-field environment and the virtual reality environment is a far-space environment.

20. The system of claim 19 wherein the computer is adapted to convert the video images of the real-time physical near-field environment and the video images of the virtual reality far-space environment into bitmaps.

* * * * *